DATA STORAGE SYSTEM

Filed Feb. 13, 1963 4 Sheets-Sheet 1

Inventors
JANINE N. L. BÉZAGUET
ANDRÉ J. JUDEINSTEIN
By Percy P. Lantzy
Attorney Jan. 24, 1967 J. N. L. BÉZAGUET ETAL 3,300,624

DATA STORAGE SYSTEM

Filed Feb. 13, 1963 4 Sheets-Sheet 2

Inventors
JANINE N. L. BÉZAGUET
ANDRÉ J. JUDEINSTEIN
By Percy P. Lantzy
Attorney

DATA STORAGE SYSTEM

Filed Feb. 13, 1963 4 Sheets-Sheet 3

Inventors
JANINE N. L. BÉZAGUET
ANDRÉ J. JUDEINSTEIN
By
Attorney

Jan. 24, 1967 J. N. L. BÉZAGUET ET AL 3,300,624

DATA STORAGE SYSTEM

Filed Feb. 13, 1963 4 Sheets-Sheet 4

Inventors
JANINE N. L. BÉZAGUET
ANDRÉ J. JUDEINSTEIN
By

Attorney 3,300,624
DATA STORAGE SYSTEM
Janine Nicole Louise Bézaguet, Sceaux, Seine, and André Jacques Judeinstein, Antony, Seine, France, assignors to International Standard Electric Corporation, New N.Y., a corporation of Delaware
Filed Feb. 13, 1963, Ser. No. 258,323
Claims priority, application France, Feb. 20, 1962, 888,560, Patent 1,325,653
8 Claims. (Cl. 235—92)

The present invention concerns a new binary data storage system wherein the unit storage cells comprise semiconductor elements known as "tunnel diodes."

A certain number of elements are known which may be used for storage owing to the fact that they present two stable states, such as magnetic cores and ferro-electrical capacitors. The magnetic cores which are used at present in numerous applications, present the inconvenience that the duration of a write or of a read time operation is relatively high (generally of several microseconds) and that an increase of the operation speed can be obtained only by a considerable increase in selection currents. Last, the classical core is a storage element wherein the information is destroyed when read, so that provision must be made for a re-writing device when said information must be kept.

Another element which may be used as a storage unit element is the condenser of usual type, which may present, for instance, between its terminals either a certain voltage or a zero voltage characterizing the state in which the element is found. Condenser matrix storages have been achieved in which the write and read out speeds are of about one eighth of microsecond and which are selected by low amplitude voltages. Nevertheless, these storage units present also the inconvenience of a destructive reading and, besides, the information must be regenerated at close intervals.

Certain two terminal elements whose static characteristic curve presents a region of negative resistance located between two regions of positive resistance may also be used as storage elements presenting an operation stable state in each one of the positive resistance regions.

The Esaki diode or "tunnel diode" which is used in the storage unit according to the invention, is an element having a negative resistance characteristic. Its characteristics are well known and are described in particular, in the article published by G. C. Messenger, W. Steiger, C. D. Todd, in the July, August 1960, issue of the "Solid State Journal" called "A Survey of Tunnel Diodes," page 35.

Thus, the static characteristic curve of a tunnel diode representing the direct current which flows through it against the voltage applied at its terminals comprises, in the direction of increasing voltages, a first positive resistance part, in which the current increases from zero to the peak value $Ip$ for a peak voltage $Vp$, a negative resistance part in which the current decreases from $Ip$, to the valley current value $Iv$, which is reached for a valley voltage $Vv$, and a second positive resistance part in which the current increases from the point $Iv$, $Vv$.

The tunnel diode presents the advantage, over other elements of the same kind, that its peak current is given with small tolerances and that the effect of temperature over said current is relatively small.

On the contrary, the valley which is a zone in which the current $Iv$ varies slightly at constant temperature is rather badly defined and said current is depending upon the temperature.

The object of the present invention is thus to provide for a non-destructive read-out storage unit cell using a tunnel diode as bistable element.

Another object of the invention is to provide for a storage matrix equipped with such storage unit cells.

The invention will be particularly described with reference to the accompanying drawings in which.

Figure 1:
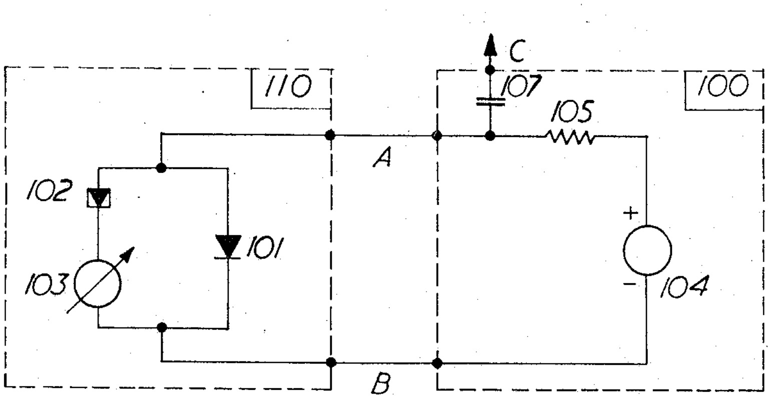
FIGURE 1 represents the diagram of a storage unit cell.

FIGURE 1 represents the diagram of a storage unit cell according to the invention which is referenced 110 and of its supply source which is referenced 100. This cell comprises a normal diode 101 and a tunnel diode 102 connected in parallel, the whole assembly being connected to the terminals A and B of the constant current generator 100. Besides, a variable voltage source of very low internal resistance 103, is placed in series with the tunnel diode and a capacitor 107 is connected between the points A and C. The constant current generator 100 which supplies the assembly of the two diodes may be considered as a two-terminal network defined by an open circuit voltage U delivered by the generator 104 and by a short circuit current $I=U/R$, expression wherein R represents the value of the dipole internal resistance materialized by the resistance 105, this value being very high with respect to the equivalent resistance of the storage cell.

Figures 2, 3:
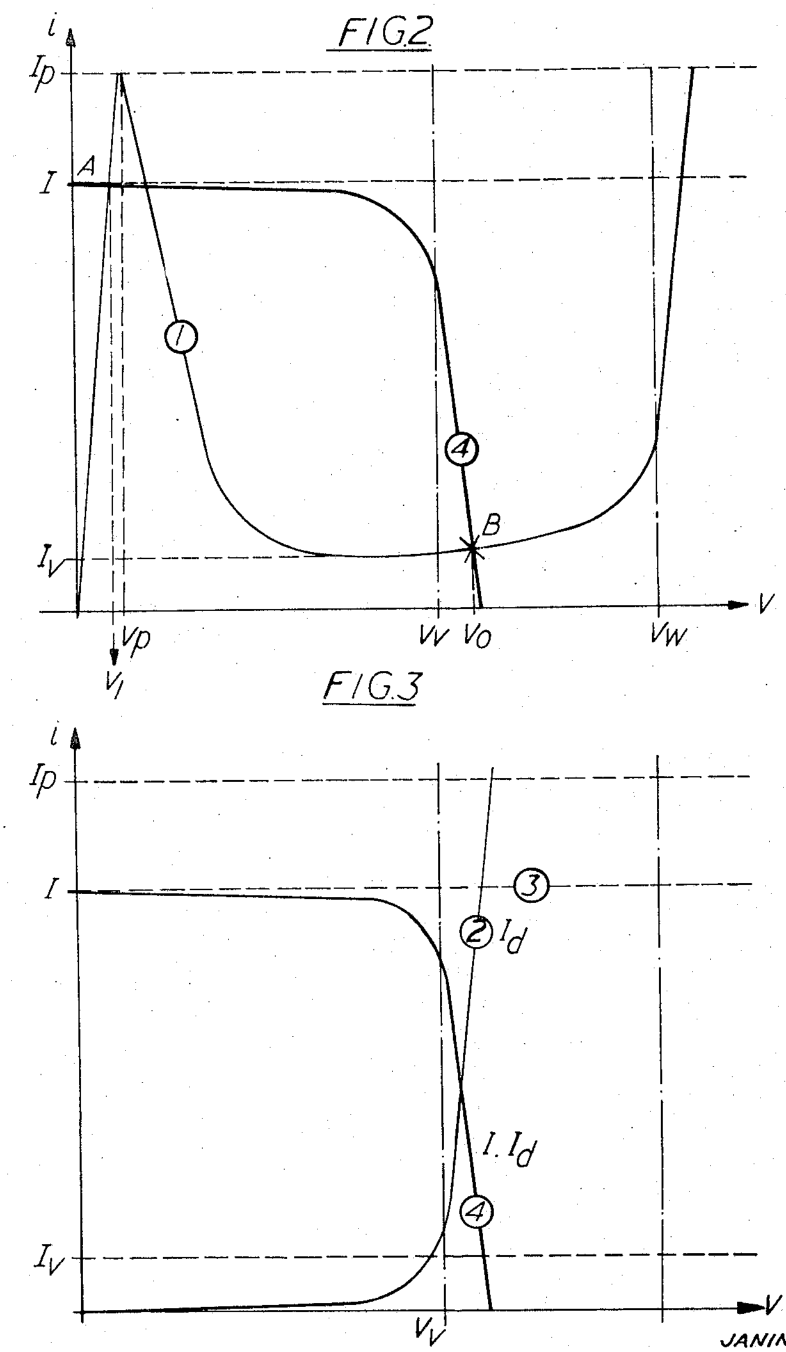
FIGURE 2 represents the characteristic curve of the tunnel diode 102.
FIGURE 3 represents the characteristic curve of the normal diode 101.

FIGURE 2 represents, in particular, the characteristic curve of the tunnel diode 102 which is referenced 1 (this curve is traced in a thin continuous line). The remarkable points of this curve are the "peak" defined by a current $Ip$ and a voltage $Vp$ and the "valley," the middle point of which is defined by a current $Iv$ and a voltage $Vv$. The voltage $Vw>Vv$ corresponding approximately to the end of the valley has also been marked.

FIGURE 3 represents, in thin continuous line, the characteristic curve of the normal diode 101 referenced 2. This diode is chosen in such a way as, for a current I ranging between the currents $Ip$ and $Iv$ defined in relation with the characteristic of the tunnel diode (FIGURE 2), the voltage drop it introduces ranges between $Vv$ and $Vw$. By comparing FIGURES 2 and 3, it is seen that, for the normal diode represented, this voltage drop is slightly higher than $Vv$ when the current which flows through it has an amplitude I.

Figure 4:
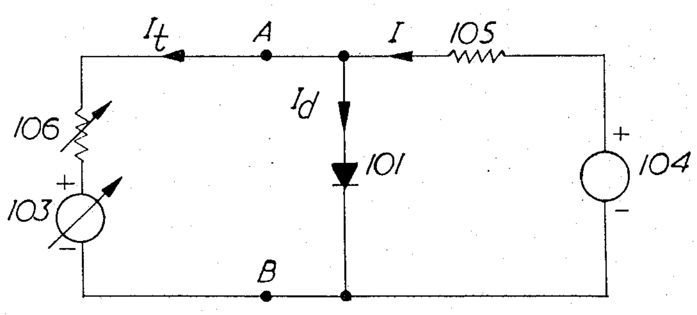
FIGURE 4 represents an equivalent circuit of the storage cell.

FIGURE 4 represents an equivalent circuit of the storage cell in which the tunnel diode 102 is replaced by a variable impedance 106, to which will be given the reference Z. The current flowing through the normal diode will be referenced $Id$ and the current flowing through the impedance 106 will be referenced $It$.

By means of this circuit, and referring to FIGURE 3, one will study the variations of the difference of potential $VA-VB$ across the terminals of the normal diode 101, when the impedance Z and the voltage E supplied by the generator 103 vary. It will be assumed, first of all, that $E=0$ and that Z increases. When $Z=0$, one has $$VA-VB=0$$

$Id=0$, since no current flows through the normal diode. When the impedance Z increases, still remaining very low with respect to R, so that the current I flowing through the resistance 105 remains constant, the voltage $VA-VB$ increases up to the time when the diode becomes conductive. The current $It=I-Id$ flowing through the impedance Z thus decreases to zero when the voltage $VA-VB$ is such as $Id=I$.

The characteristic curve of the current $I-Id$ flowing through the impedance Z, carrying the reference 4 has been shown on FIGURE 3, in continuous thick line. This curve is obtained by subtracting, point by point, the ordinates of the straight line 3 (representing the current I) and of the curve 2. By replacing the impedance Z by the tunnel diode, one obtains the diagram of the FIGURE 2 on which are shown the curve 1 which is the characteristic of the tunnel diode and the curve 4 which has just been set up on the FIGURE 3 and which gives the variation of the current $It=I-Id$ flowing through the tunnel diode against the voltage at the terminals of the storage element. An operation point of the tunnel diode can thus be found only on one of the intersections of the curves 1 and 4. It is known that only the operation points A and B located on positive resistance parts of the characteristic of the tunnel diode are stable operation points. On the diagram of FIGURE 2, the ordinate of an intersection gives thus the current $It=I-Id$ flowing through the tunnel diode. The current I$d$ flowing through the normal diode is $Id=I-It$. If now, the source 103 supplies a voltage E different from zero and positive with respect to the point B, its application corresponds to a translation of the characteristic curve of the tunnel diode parallel to the voltage axis in the direction of the increase voltages and of amplitude E.

The operation of the storage cell shown on FIGURE 1 will now be studied, when this voltage E varies. Referring to FIGURE 2, it will be admitted that the cell is in the 1 state when the operation point is in A and that it is in the 0 state when the operation point is in B. It is seen on the figure that the 0 state corresponds to the setting up of a high potential difference V0 at the terminals of the cell and that the 1 state to the setting up of a low potential difference V1 at the terminals of the cell.

Figure 5:
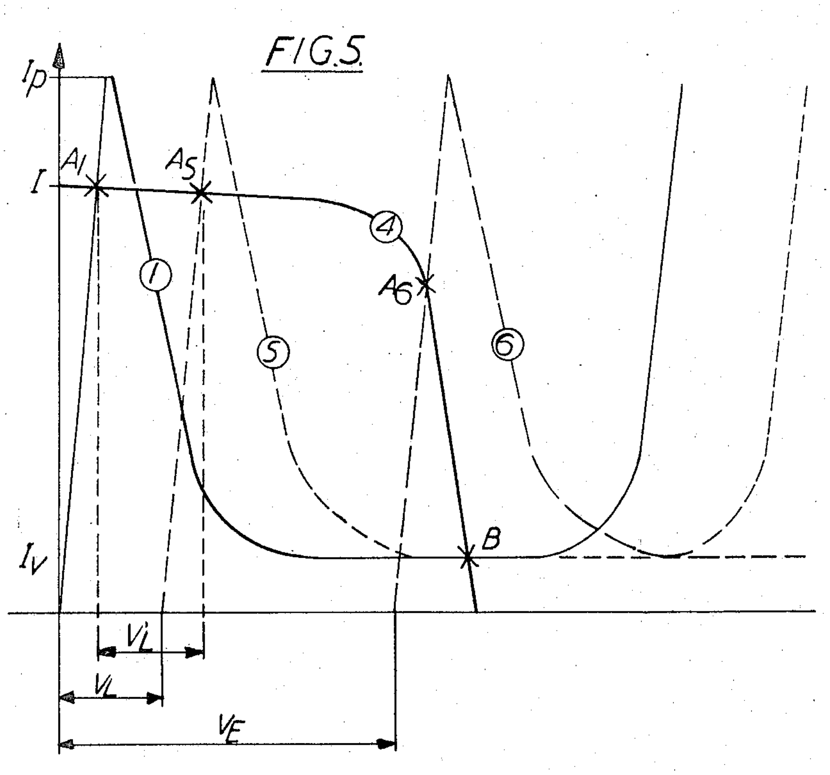
FIGURE 5 represents the operation diagram of the cell for various values of the voltage E.

FIGURE 5 represents the operation diagram of the cell for various values of the voltage E. When $E=0$, the curves 1 and 4 are located as on FIGURE 2 and the two stable points of operation, reference A1 and B, are located at the intersections of these two curves. When the voltage E is positive and increases, the characteristic curve of the tunnel diode shifts towards the right hand side of the figure and takes successively the positions 5 and 6. In the first one of these positions, two stable operation points A5 and B are always available. On the contrary, in the second one, only one single operation point A6 is available. Assuming that, initially, $E=0$ and that the storage cell is in the 0 state, i.e., that the operation point is located in B (crosspoints of the curves 1 and 4) the application of a voltage $E=VE$ shifts the characteristic curve of the tunnel diode to 6 and the operation point is set up in A6. When this voltage VE is suppressed this operation point shifts once again in A1 so that the application of a control voltage VE in series with the tunnel diode has enabled the writing of a digit 1. This write control voltage may be defined as a voltage of such an amplitude that, after its suppression, the storage cell is in the 1 state whichever be its initial state. Assuming now that the storage cell is initially in one of the 0 or 1 state (point A1 or B of the curves 1 and 4) the application of a voltage $E=VL$ shifts the characteristic of the tunnel diode to 5 and this curve cuts always the curve 4 in two points A5 and B, so that the state of the cell is not disturbed. It is seen from the figure that, if the cell was in the 1 state, the operation point has shifted from A1 to A5, so that a pulse the amplitude of which is slightly different from the amplitude VL of the control voltage appears between the terminals C and B of the cell (see FIGURE 1), said pulse being used as a read signal of a 1. During this read operation, it is seen, on FIGURE 5, that if the cell is in the 0 state, the operation point is not shifted at all and thus that no read voltage is collected in this case.

In practice, it may be possible that the valley be not as wide as indicated on the figure. Nevertheless, due to the very small slope of the characteristic 4 in its intersection zone with the valley, the voltage collected for the read out of a 0 is always very low with respect to that collected for the read out of a 1.

This read out control voltage VL may be defined as a voltage whose amplitude must be sufficiently high for obtaining a read out signal of sufficient amplitude for the exploitation and sufficiently low for enabling the cell to recover its initial state, when it is suppressed.

The storage unit cell, according to the invention, enables thus to carry out a non destructive reading of the written information.

The condition for clearing the cell, i.e. for setting it to the 0 state of the cell will now be studied. By examining FIGURE 2, it is seen that this clearing is obtained when the curve 4 does not intersect anymore the peak of the characteristic curve of the tunnel diode, i.e. when the current delivered by the source 100 is higher than the peak current I$p$. It has been seen, during the study of the FIGURE 1, that one could write $I=U/R$. The clearing may be obtained, either by increasing the voltage of the source 104 from the value U to the value U' so that the short circuit current $I'=U'/R$ is higher than the current I$p$, or by reducing the equivalent internal resistance to a value R' so that the short circuit current $I''=U/R'$ be higher than the current I$p$.

Figure 6:
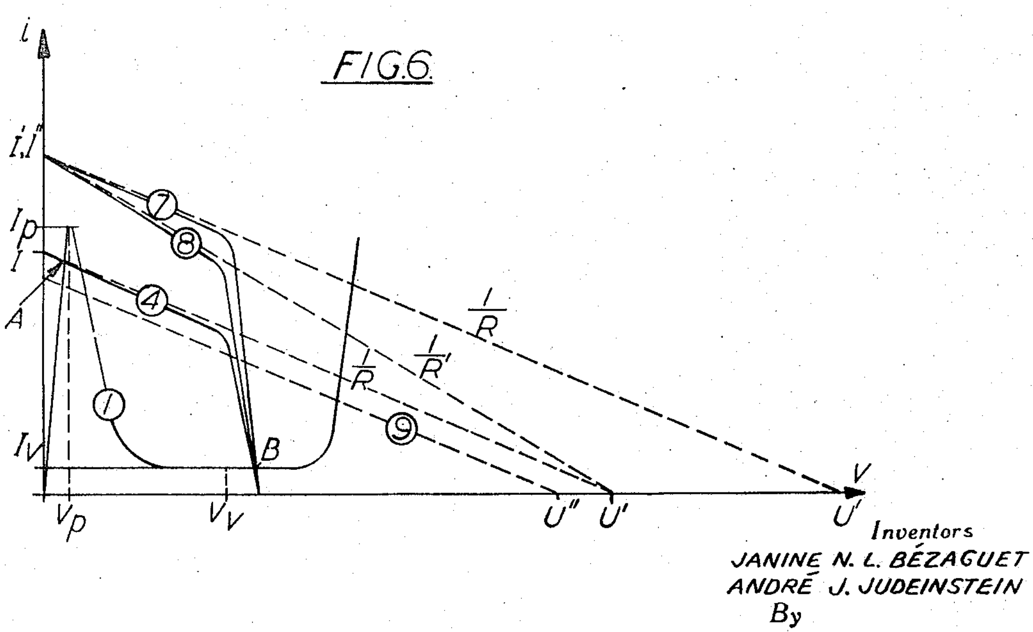
FIGURE 6 represents the operation diagrams for the clearing of the cell.

FIGURE 6 represents the operation diagrams for these two types of clearing. The characteristic of the tunnel diode has been referenced 1 and the characteristic of the current $I-Id$ for a source U, I, has been referenced 4. The characteristic $I-Id$ has been referenced 7 for a source U', I', and 8, for a source U, I''. It is seen that these characteristics intersect the characteristic 1 only in the valley, thus assuring a correct clearing of the cell.

In the course of the description, one will describe, by way of a non limitative example, a unit storage cell and groups of cells wherein the clearing will be carried out by reduction of the internal resistance of the source 100, being well understood that this reduced resistance remains very high with respect to the equivalent internal resistance of the one or several cells constituting the group, the equivalent internal resistance of one cell being equal to $I/V1$ or $I/V0$ according to whether it is in the 1 state or in the 0 state.

Figure 7:
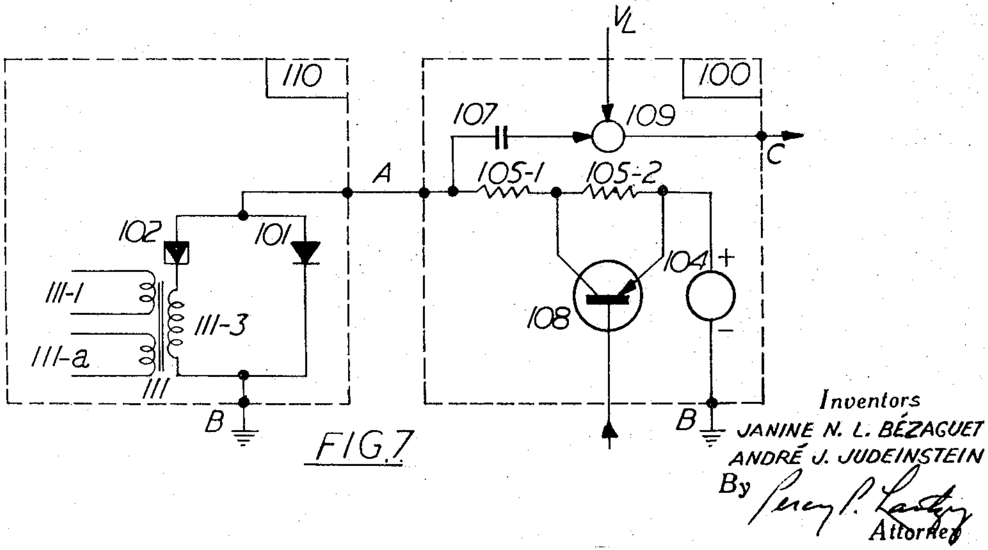
FIGURE 7 represents a practical realization diagram of the unit cell and of its supply.

FIGURE 7 represents the practical diagram of realization of the unit cell and of its supply. In the cell 110, the voltage source 103 is materialized by a transformer 111 and in the supply 100, an AND circuit 109 is interposed between the capacitor 107 and the terminal C, the reduction of the internal resistance of the source 100 being obtained by short-circuiting a part 105–2 of the resistance 105 by means of a transistor 108 connected to the terminals of the resistance 105–2 and operating as a switch. Since the voltage applied to the emitter of this transistor is positive with respect to earth and equal to U, the transistor is blocked for a base voltage $$Vb=U+\Delta U$$

and is conductive for a base voltage $Vb=U-\Delta U$, the voltage $\Delta U$ may be of one fraction of volt. In the first case, the resistance 105–2 is in operation, and in the second case, it is short-circuited so that it is sufficient to apply permanently to the base of the transistor a voltage $U+\Delta U$ and to apply thereto, in order to carry out a reset to zero, a negative pulse of amplitude $2\Delta U$. In the course of the description, this transistor will be represented symbolically by a switch.

The transformer 111 comprises two primary windings 111–1 and 111–2 and a secondary winding 111–3 mounted in series with the tunnel diode 102.

It has been seen during the study of FIGURE 5 that the amplitude of the write control voltage VE was higher than that of the read control voltage VL. In a particular mode of realization, given by way of a non limitative example, one may chose $VE=2VL$, while complying at the same time with the conditions established during the description of this figure. In these conditions, if it is admitted that $VL=VE/2=V$, the write control voltage is obtained by applying simultaneously to each one of the windings 111–1 and 111–2, a voltage V and the read control voltage, by applying to one of these windings, to the winding 111–1 for instance, a voltage V. In order to avoid parasite signals on the read output C of the cell, an AND circuit 109 has been placed which is activated by a read signal VL. It will be seen further on that this AND circuit 109 is also used, in a matrix arrangement, for carrying out the selection of the read column, the winding 111–1 of the transformer 111 being then used for the line selection both for writing and for reading and the winding 111–2 for the column selection during writing.

Figure 8:
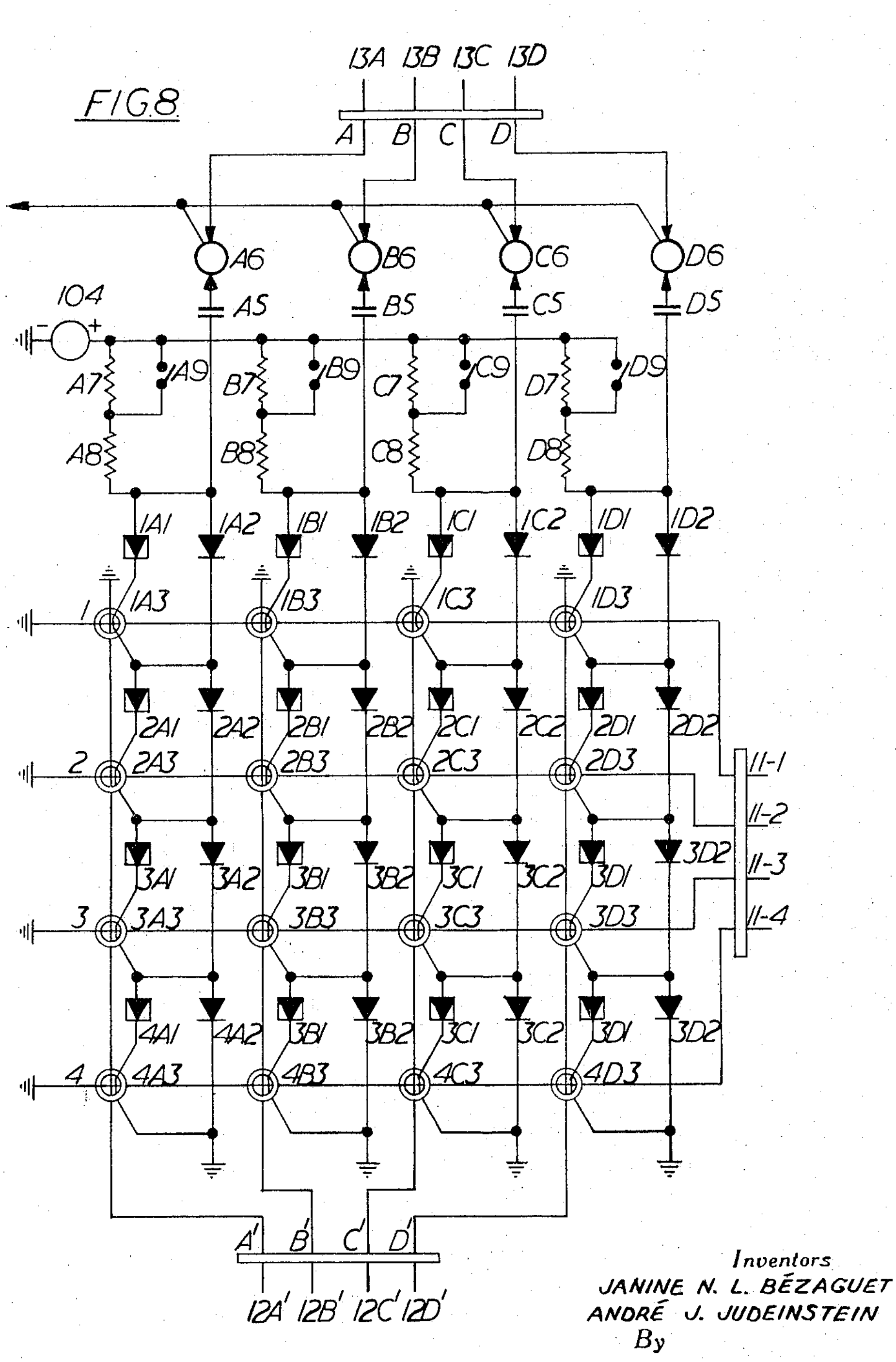
FIGURE 8 represents a matrix storage equipped with storage unit cells.

FIGURE 8 represents a matrix store equipped with the unit storage cells which have just been described. The store represented by way of a non limitative example comprises four rows referenced 1 to 4, and four pairs of columns referenced AA', BB', CC', DD'. A group of four unit cells connnected in series is associated to each pair of columns. Each element of a cell bears three figure references. The two first characterize the line and the column to which they are associated, and the third figure is a numeral: 1 for the tunnel diode, 2 for the normal diode and 3 for the transformer which was referenced 111 on FIGURE 7. Thus the normal diode placed at the crosspoint of the row 2 and of the pair of columns BB' is referenced 2B2. In each group, the elements which were located in the block 100 of FIGURE 7 carry a two figure reference, the first one of which characterizes the pair of columns, the second figure is "5" for the condenser 107, "6" for the AND circuit 109, "7" for the resistance 105–2, "8" for the resistance 105–1 and "9" for the switch which symbolizes the transistor 108. Thus the switch of the pair of columns AA' is referenced A9.

The transformers 1A3, 2A3, 3A3, 4A3 are constituted by magnetic cores in soft material in which the primary windings are first, the row conductors 1, 2, 3, 4 which constitute the row selection windings for writing and reading (winding 111–1 of FIGURE 7) and second, the column conductors A', B', C', D' which constitute the column selection windings for writing (winding 111–2 of FIGURE 7). The second winding of each transformer is mounted in series with the tunnel diode of the cell to which it is associated.

The clearing of a group of cells, for instance the one associated to the pair of columns AA', is carried out by closing the switch A9. The internal resistance of the source becomes then R' (resistance A8) and a current I' flows through all the cells of the group.

As it has been explained in relation with the FIGURE 7, the selection of a cell during writing is carried out by voltage coincidence. Thus, since the group of cells associated to the pair of columns CC' has been previously cleared a "1" is written in the cell located at the crosspoint of the row 2 and of the column C by applying two control voltages of amplitude V respectively to the row 11–2 and to the column 12C'. On the contrary, for the reading of the information written in the same cell, only one control voltage of amplitude V is applied on the row 11–2 which initiates the non-destructive read-out of the information written in all the cells associated to this line. The selection of the pair of columns CC' is then carried out by the opening of the AND circuit C6 associated to the column C which is activated by a signal supplied on the conductor 13C.

This storage may be used for the series writing and reading of $m$ words of $n$ digits, if $n$ designates the number of rows and $m$ designates the number of columns. The clearing of a word written in the cells of a column, for instance the column B, is carried out by closing the switch B9.

In this mode of operation, the writing and reading are controlled by means of clock signals $t1, t2 \ldots tn$, established in time succession and in a recurrent way. In the case of FIGURE 8, $n=4$, and the signals $t1$, $t2$, $t3$, $t4$ are applied cyclically, respectively to the conductors 11–1, 11–2, 11–3, 11–4. When the number 1101 must, for instance, be written in the group of cells AA', a signal of amplitude V is applied to the conductor 12A' at time slots $t1$, $t2$ and $t4$. It will be noted that, during the time slot $t3$, a pulse of amplitude slightly different from V appears on the input of the AND circuit A6 and that, during the time slots $t1$, $t2$ and $t4$, pulses of still more important amplitude appear therein. Nevertheless, since the AND circuit A6 is blocked during writing, these parasite voltages are not transmitted at the output.

The signals of amplitude higher than V which appear on the input of the AND circuit A6 during the writing of a 1 may be used according to a characteristic of the invention for the checking of the writing. For this, it is sufficient to apply, to the conductor 13A, the same signals as those on the conductor 12B' and to apply the signals delivered by the AND circuit A6 to an amplitude comparator device.

For the reading, since the signals $t1$, $t2$, $t3$, $t4$ are applied to the rows in time succession, each cell placed on the activated row and which is the 1 state delivers a read signal, only the signal belonging to the selected column being exploited by the activation of the corresponding AND circuit.

The writing may also be carried out in a parallel form. In this case, a control signal V is applied for instance, to the conductor 12A' and the four digits of the word to be written are supplied on the group of conductors 11. The word is then written in the group of cells associated to the pair of columns AA'.

Referring to FIGURE 2, it is seen that the potential difference across the terminals of a cell is V1 when it is in the 1 state, and V0 when it is in the 0 state. The total potential difference across the terminals of a group of $n$ cells thus range between $n$V0 and $n$V1, in the extreme cases when all the cells are in the 0 state and all the cells are in the 1 state The value of the resistances 7 and 8 of the column (see FIGURE 8) would thus be such as the voltage drop across their terminals is very high with respect to the voltage $n$V0 in order that the currents I and I' which flow through the group of cells be constant whatever may be the state of each one of the cells.

Last, one will suppose that the internal resistance of the source 104 is not negligible. As the clearing of a given group of cells is obtained by short-circuiting the resistance 8 of this group of cells, which increases the current delivered by the source 104, the potential difference at the terminals of each one of the other groups and of their resistances 8 and 9 is slightly reduced. This is shown on FIGURE 6, by the load line, referenced 9, and it is seen that the state of the cells cannot be disturbed by this voltage reduction.

In an example of realization using germanium tunnel diodes in which $Ip=5$ ma., the duration of each time slot signal $t1, t2 \ldots tn$ is 30 ns. and the duration of the signals V is 15 ns., giving a write or read frequency of approximately 30 mc. By choosing $I=3$ ma., the maximum potential difference VO across the terminals of a cell is 0.5 v. so that the permanent dissipation in the cell is at the maximum 1.5 mw. The voltage 2V for the writing of a 1 is approximately 200 mv. with a current lower than a current I vizus a dissipation lower than 0.6 mw.

While the principles of the above invention have been described in connection with specific embodiments and particular modifications thereof, it is to be clearly understood that this description is made by way of example and not as a limitation of the scope of the invention.

What we claim is:

1. A storage unit cell comprising a tunnel diode and a normal diode having a potential drop, for a direct current I, equal to the valley voltage $V_v$ of the tunnel diode, said cell comprising:

means for connecting together respectively the anodes and the cathodes of said diodes;

supply means of this storage cell comprising a direct current source delivering a bias current I lower than the peak current of the tunnel diode, said tunnel diode presenting one of two stable states of operation, the 1 state characterized by the fact that the current flowing through said diode is equal to the current I and the 0 state characterized by the fact that the current which flows through it is equal to the valley current, these two states being also characterized by the presence, at the terminals of the cell, respectively of a low potential difference VI and a high potential difference VO;

means acting under the action of a clearing signal in order to set up a bias current $I_o$ higher than the peak current $I_p$ of the tunnel diode, so that said diode is reset in the 0 state and that, after suppression of said signal, the current flowing through the tunnel diode is the valley current;

means for modifying the voltage applied to one of the terminals of the tunnel diode by the application, in series with said voltage, of a control voltage of such a polarity that the potential difference between the terminals of said tunnel diode be decreased, said control voltage being either a write voltage VE for controlling the writing of a 1 and of such an amplitude that, after its suppression, the current flowing through the tunnel diode is the current I or a read voltage of amplitude VI such as, after its suppression, the state of the cell is not modified, the read-out voltage collected across the terminals of the cell being very small for the read out of a 0 and equal to VL for the read-out of a 1;

the direct current source being a constant current source characterized by an open circuit voltage U, a short-circuit current $I=U/R$, R being the equivalent internal resistance of the source which is very high with respect to the equivalent impedance $I/VI$ or $I/VO$ of a storage cell comprising:

means for setting up the current I to a value lower than the peak current of the tunnel diode;

means acting under the action of a clearing signal in order to reduce the internal resistance of the source of a value R' so that its short-circuit $I'o=U/R'$ is higher than the peak current of the tunnel diode; and alternative means acting under the action of a clearing signal in order to increase the open circuit voltage of the source to a value U' so that its short-circuit current $I''o=U'/R$ is higher than the peak current of the tunnel diode.

2. A register for the storage of a $n$ digit binary word comprising:

means for connecting in series $n$ storage unit cells;

each storage unit cell comprising a tunnel diode and a normal diode having a potential drop, for a direct current I, equal to the valley voltage $V_v$ of the tunnel diode, said cell comprising:

means for connecting together respectively the anodes and the cathodes of said diodes;

supply means of this storage cell comprising a direct current source delivering a bias current I lower than the peak current of the tunnel diode, said tunnel diode presenting one of two stable states of operation, the 1 state characterized by the fact that the current flowing through said diode is equal to the current I and the 0 state characterized by the fact that the current which flows through it is equal to the valley current, these two states being also characterized by the presence, at the terminals of the cell, respectively of a low potential difference VI and a high potential difference VO;

means acting under the action of a clearing signal in order to set up a bias current $I_o$ higher than the peak current $I_p$ of the tunnel diode, so that said diode is reset in the 0 state and that, after suppression of said signal, the current flowing through the tunnel diode is the valley current;

means for modifying the voltage applied to one of the terminals of the tunnel diode by the application, in series with said voltage, of a control voltage of such a polarity that the potential difference between the terminals of said tunnel diode be decreased, said control voltage being either a write voltage VE for controlling the writing of a 1 and of such an amplitude that, after its suppression, the current flowing through the tunnel diode is the current I or a read voltage of amplitude VL such as, after its suppression, the state of the cell is not modified, the read-out voltage collected across the terminals of the cell being very small for the readout of a 0 and equal to VL for the read-out of a 1;

the direct current source being a constant current source characterized by an open circuit voltage U, a short-circuit current $I=U/R$, R being the equivalent internal resistance of the source which is very high with respect to the equivalent impedance $I/VI$ or $I/VO$ of a storage cell comprising:

means for setting up the current I to a value lower than the peak current of the tunnel diode;

means acting under the action of a clearing signal in order to reduce the internal resistance of the source to a value R' so that its short-circuit $I'o=U/R'$ is higher than the peak current of the tunnel diode;

alternative means acting under the action of a clearing signal in order to increase the open circuit voltage of the source to a value U' so that its short-circuit current $I''o=U'R$ is higher than the peak current of the tunnel diode;

means for supplying the $n$ cells connected in series by a constant current source I having an equivalent internal resistance R which is very high with respect to the impedance of the $n$ unit cells, whatever may be the state of each one of them;

means for bringing the bias current of the $n$ cells to a valve $I'o$ or $I''o$ higher than the peak current of the tunnel diodes so that the $n$ cells of the register are simultaneously reset to the 0 state;

selective application means of the write signal VE to the cells in which a 1 must be written, the writing of the different digits of a word may be carried out, either simultaneously in parallel form or in time succession in series form;

read-out means of the word written in the register by the application, in time succession, of $n$ read signals VL to the $n$ cells of the register so that the read-out of the different digits is carried out in series form, the voltage variations at the terminals of the different cells being collected on the terminals of the register which constitute the reading terminals; and gating means interposed on the reading terminals of the register and activated by the read signals so that the voltage variations collected on the reading terminals should be exploited only during a read operation.

3. A matrix type storage having a capacity of $m$ words of $n$ binary digits comprising:

means for grouping $m$ registers of $n$ binary digits and for supplying each one of these registers by a constant current source I;

each register having means for connecting in series $n$ storage unit cells;

each storage unit cell comprising a tunnel diode and a normal diode having a potential drop, for a direct current I, equal to the valley voltage $V_v$ of the tunnel diode, said cell comprising;

means for connecting together respectively the anodes and the cathodes of said diodes;

supply means of this storage cell comprising a direct current source delivering a bias current I lower than the peak current of the tunnel diode, said tunnel diode presenting one of two stable states of operation, the 1 state characterized by the fact that the current flowing through said diode is equal to the current I and the 0 state characterized by the fact that the current which flows through it is equal to the valley current, these two states being also characterized by the presence, at the terminals of the cell, respectively of a low potential difference VI and a high potential difference VO;

means acting under the action of a clearing signal in order to set up a bias current $I_o$ higher than the peak current $I_p$ of the tunnel diode, so that said diode is reset in the 0 state and that, after suppression of said signal, the current flowing through the tunnel diode is the valley current;

means for modifying the voltage applied to one of the terminals of the tunnel diode by the application, in series with said voltage, of a control voltage of such a polarity that the potential difference between the terminals of said tunnel diode be decreased, said control voltage being either a write voltage VE for controlling the writing of a 1 and of such an amplitude that, after its suppression, the current flowing through the tunnel diode is the current I or a read voltage of amplitude VL such as, after its suppression, the state of the cell is not modified, the read-out voltage collected across the terminals of the cell being very small for the read-out of a 0 and equal to VL for the read-out of a 1;

the direct current source being a constant current source characterized by an open circuit voltage U, a short-circuit current $I=U/R$, R being the equivalent internal resistance of the source which is very high with respect to the equivalent impedance $I/VI$ or $I/VO$ of a storage cell comprising:

means for setting up the current I to a value lower than the peak current of the tunnel diode;

means acting under the action of a clearing signal in order to reduce the internal resistance of the source to a value R′ so that its short-circuit $I'o=U/R'$ is higher than the peak current of the tunnel diode;

alternative means acting under the action of a clearing signal in order to increase the open circuit voltage of the source to a value U′ so that its short-circuit current $I''o=U'R$ is higher than the peak current of the tunnel diode;

means for selecting each one of the registers by $m$ column conductors having access to the $m$ storage registers;

coupling means comprising, for each storage cell, a transformer having a first and second primary windings and one secondary winding, the first primary winding being connected in series with the row conductor assigned to this cell, the second primary winding being connected in series with the column conductor assigned to this cell and the secondary winding being placed in series with the tunnel diode;

gating means interposed in the reading terminals of each one of the registers and activated selectively for the reading of the word stored in a given register.

4. A storage cell unit comprising:

a source of constant current;

a first circuit connected to said source, including a tunnel diode having a characteristic peak current amplitude greater than the amplitude of said constant current;

a second circuit in shunt with said first circuit, including an ordinary diode poled in the same current conducting direction as said tunnel diode and having a current voltage characterisitc which intersects the corresponding characteristic of the tunnel diode in the valley region of the latter; and means including a first inductive element in series with said tunnel diode, coupled to said first circuit for controlling the impedance of said tunnel diode, and a second inductive element inductively coupled to said first element for coupling control voltage signals thereto.

5. A matrix type storage according to claim 3 to which is associated a clock establishing, in a recurrent way, cycles of $n$ time slot signals of amplitude $VE/2$ on which are synchronized the signals which are to be written in said storage, the presence of a message signal of amplitude $VE/2$ at a time position characterizing a 1 and its absence a 0, said storage comprising:

serial writing means of a word of $n$ digits in a register of the store by the application, first, of the message signals to the column conductor associated to said register, and second, in time succession, of the $n$ time slot signals to the $n$ row conductors;

serial read-out means of a word of $n$ digits stored in a register of the store by the application, in time succession, of the $n$ time slot signals to the row conductor, the amplitude of the control voltage VL being thus equal to $VE/2$ and the voltage variations across the terminals of the different cells of of the storage being collected, in time succession, on the terminals of the $m$ registers, only the voltage variations collected across the terminals of the considered register being exploited by the activation of the gating means associated to said register.

6. A matrix type storage according to the claim 5 comprising writing means in parallel form of a $n$ digit word in a storage register by the application, first, of a signal of amplitude $VE/2$ to the column conductor associated to said register and second, of signals of amplitude $VE/2$ to each row conductor associated to a storage cell in which a 1 is to be stored.

7. A storage cell unit according to claim 4 including a magnetic core linked to said first and second inductive elements for inductively coupling said elements.

8. A storage cell unit according to claim 4 including resetting means coupled to said constant current source for momentarily increasing the current output thereof to an amplitude slightly in excess of the said peak current amplitude of said tunnel diode, whereby said tunnel diode is stably conditioned to a high positive resistance state.

References Cited by the Examiner

UNITED STATES PATENTS

| | | | |
|---|---|---|---|
| 3,201,598 | 8/1965 | Pressman | 307—88.5 |
| 3,218,465 | 11/1965 | Hovey | 307—88.5 |

MAYNARD R. WILBUR, *Primary Examiner.*

J. F. MILLER, *Assistant Examiner.*